US008010140B2

(12) United States Patent
Suh et al.

(10) Patent No.: US 8,010,140 B2
(45) Date of Patent: Aug. 30, 2011

(54) METHOD OF SPACE DIVISION MULTIPLE ACCESS COMMUNICATION USING USER COOPERATION AND SYSTEM OF ENABLING THE METHOD

(75) Inventors: Jung Hoon Suh, Yongin-si (KR); Sung Jin Kim, Suwon-si (KR); Ping-Heng Kuo, Pintung (TW); Joon-Il Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 685 days.

(21) Appl. No.: 12/118,812

(22) Filed: May 12, 2008

(65) Prior Publication Data

US 2009/0104926 A1 Apr. 23, 2009

(30) Foreign Application Priority Data

Oct. 18, 2007 (KR) .................. 10-2007-0105263
Nov. 30, 2007 (KR) .................. 10-2007-0123979

(51) Int. Cl.
*H04Q 7/22* (2006.01)

(52) U.S. Cl. ..... 455/513; 455/518; 455/519; 455/552.1; 455/140

(58) Field of Classification Search .................. 455/513, 455/420, 425, 424, 456.5, 456.6, 464, 9, 455/512, 525, 552.1, 518, 519, 140, 466, 455/566, 567, 426.1; 725/38, 39, 131, 126, 725/14, 109, 119; 370/260, 270, 329, 330, 370/340; 713/310, 320; 340/825.72; 348/734; 342/373
See application file for complete search history.

(56) References Cited

U.S. PATENT DOCUMENTS

| 6,385,461 | B1 * | 5/2002 | Raith ............................ 455/518 |
| 7,529,558 | B1 * | 5/2009 | Blair et al. .................... 455/519 |
| 2006/0025079 | A1 | 2/2006 | Sutskover et al. |
| 2006/0052081 | A1 * | 3/2006 | Cho .............................. 455/403 |
| 2007/0141987 | A1 * | 6/2007 | Weinans et al. .............. 455/41.2 |
| 2007/0274460 | A1 * | 11/2007 | Shaffer et al. .................. 379/37 |
| 2009/0253446 | A1 * | 10/2009 | Chambers et al. ............ 455/466 |
| 2009/0274220 | A1 * | 11/2009 | Yun et al. ...................... 375/244 |

FOREIGN PATENT DOCUMENTS

| KR | 2003-75883 | 9/2003 |
| KR | 2006-135162 | 12/2006 |

\* cited by examiner

*Primary Examiner* — Tan Trinh
(74) *Attorney, Agent, or Firm* — NSIP Law

(57) ABSTRACT

A communication device using user cooperation is provided with a channel information reception unit to receive channel information from a plurality of member terminals within the same group, the channel information being associated with a radio channel formed between the plurality of member terminals and a base station; a member terminal selection unit to select at least one active member terminal from among the plurality of member terminals based on the channel information; and a selection information transmission unit to transmit selection information to the base station, the selection information being associated with a radio channel formed between the at least one active member terminal and the base station.

12 Claims, 6 Drawing Sheets

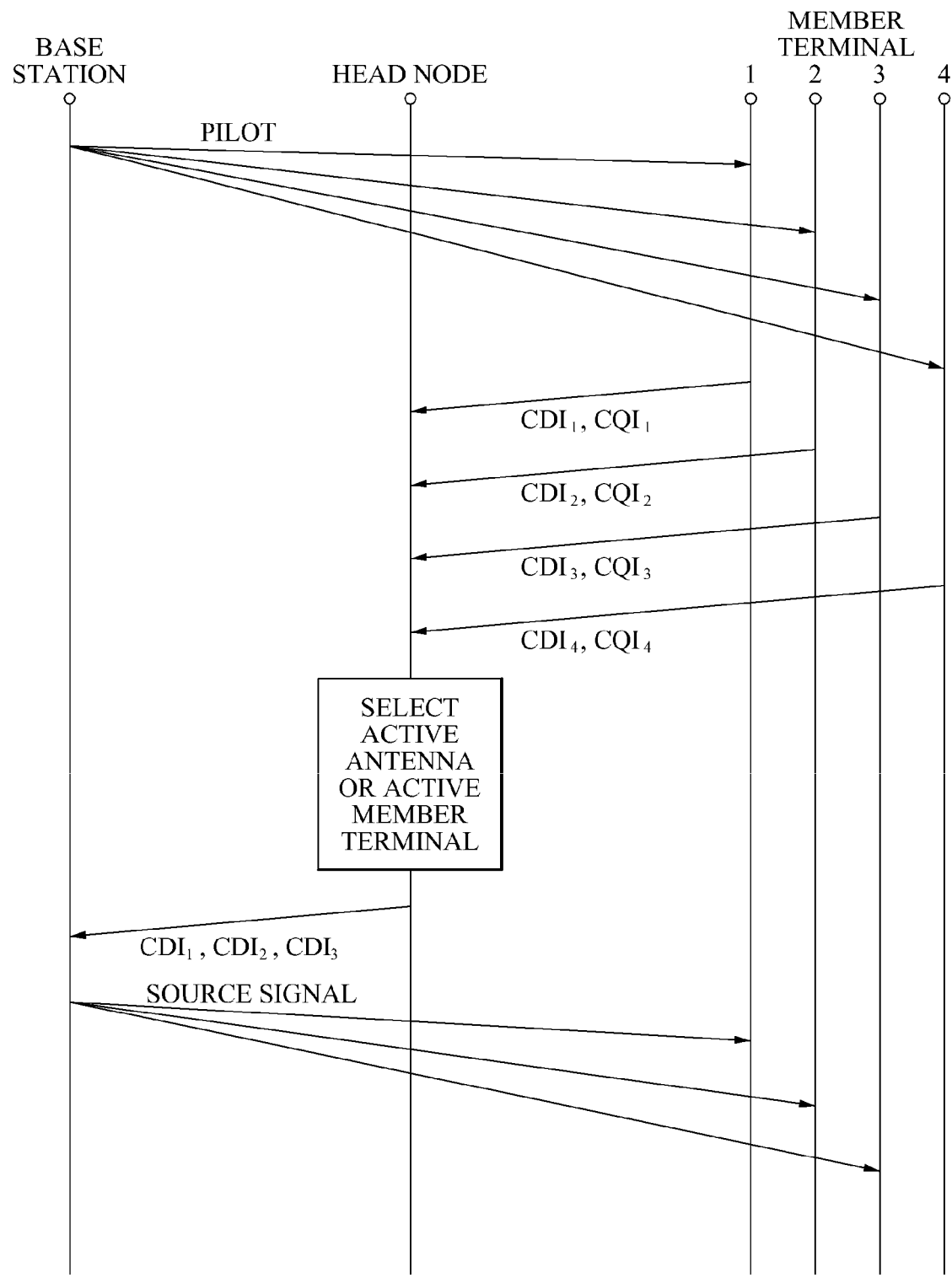

METHOD OF SPACE DIVISION MULTIPLE ACCESS COMMUNICATION USING USER COOPERATION AND SYSTEM OF ENABLING THE METHOD

CROSS-REFERENCE TO RELATED APPLICATIONS

This application claims all benefits accruing under 35 U.S.C. §119 from Korean Patent Application Nos. 2007-105263, filed on Oct. 18, 2007 and 2007-123979 filed on Nov. 30, 2007 in the Korean Intellectual Property Office, the disclosures of which are incorporated herein by reference.

BACKGROUND OF THE INVENTION

1. Field of the Invention

Aspects of the present invention relate to wireless communications using multiple-antenna systems, and more particularly, to a wireless communication system in which space-division multiple access (SDMA) communication which can generate a transmission signal more effectively even when reducing feedback data.

2. Description of the Related Art

Currently, studies for providing various multimedia services, such as, voice service in a radio communication environment and also supporting data transmission in high quality and high speed have been actively conducted. From these studies, space-division multiple access (SDMA) communication technologies using Multi-antenna have been actively developed.

The SDMA denotes a technology that allows a station to transmit (or receive) signal (i.e., at least one data stream) to (or from) multiple users in a same bandwidth and time simultaneously, via a plurality of antennas. The SDMA technology increases the data rate and total capacity of wireless communication systems by using radio resources (i.e., frequency bandwidths, time, etc.) more effectively.

Signals transmitted, via a plurality of antennas using SDMA technology, are subjected to beam-forming, via a preceding scheme, according to channel state information at a transmitter (i.e., base station "BS"). In general, in a closed-loop SDMA system, user terminals provide feedback information associated with the channel state information to a base station (BS), and the base station (BS) selects the user terminal using the feedback information and performs beam-forming in which multiple streams of the signals are emitted from transmit antennas in accordance with a precoding scheme, i.e., with independent and appropriate phase (and gain) weighting such that the signal power is maximized at the receiver input and a multipath fading effect is minimized.

In order to improve the performance of the beam-forming, an amount of the feedback information has to be increased. However, since each of the user terminals is required to transmit each of the feedback information back to the base station (BS), radio resources can be exceedingly consuming. As a result, any unreasonable increase in the amount of feedback can be very disadvantageous.

In addition, the feedback information is transmitted to the base station (BS), via a feedback link formed between the user terminal and the base station (BS); however, such a feedback link can be adversely affected by fading and noise. Accordingly, errors may occur in the feedback information while the feedback information is being transmitted back to the base station (BS). As a result, multiple problems can be created at the base station (BS) to perform the beam-forming.

Therefore, there is a need for a system and method of SDMA communication that may enable a base station to effectively perform beam-forming without unreasonably increasing the amount of the feedback information.

SUMMARY OF THE INVENTION

Several aspects and example embodiments of the present invention provide a communication system using user cooperation and a method for the same which selects an active member terminal from all member terminals within the same group, and transmits, to a base station, selection information associated with the active member terminal, thereby remarkably reducing an amount of feedback information.

An aspect of the present invention provides a communication device using user cooperation and a method for the same which transmits feedback data to a base station more effectively even without directly feeding back channel information to the base station by each of a plurality of member terminals.

Another aspect of the present invention provides a communication device using user cooperation and a method for the same which previously selects an active member terminal or an active antenna before performing a beam-forming by a base station, so that an amount of feedback information is reduced, thereby reducing errors occurring during the transmission of the feedback information.

An aspect of the present invention provides a base station and a source signal generating method which effectively performs a beam-forming even using relatively less feedback data by performing the beam-forming using selection information received from a head node.

Another aspect of the present invention provides a terminal device and a signal detecting method which transmits channel information to a predetermined head node, thereby feeding back the channel information with a relatively less error rate.

Additional aspects and/or advantages of the invention will be set forth in part in the description which follows and, in part, will be obvious from the description, or may be learned by practice of the invention.

In accordance with an example embodiment of the present invention, there is provided a communication device, which includes a channel information reception unit to receive channel information from a plurality of member terminals within the same group, the channel information being associated with a radio channel formed between the plurality of member terminals and a base station; a member terminal selection unit to select at least one active member terminal from among the plurality of member terminals based on the channel information; and a selection information transmission unit to transmit selection information to the base station, the selection information being associated with a radio channel formed between the at least one active member terminal and the base station.

In accordance with another example embodiment of the present invention, there is provided a base station, which includes a pilot generation unit to generate a pilot signal for transmission to a plurality of member terminals within the same group; a selection information-reception unit to receive, from a predetermined head node determined in advance with respect to the same group, selection information associated with a radio channel formed between at least one active member terminal and the base station when the head node selects the at least one active member terminal from among the plurality of member terminals; and a source signal generation unit to perform a beam-forming of a data stream based on the selection information to thereby generate a source signal.

In accordance with yet another example embodiment of the present invention, there is provided a terminal device, which includes a channel information-generation unit to generate channel information of a radio channel formed between a base station and the terminal device using a pilot signal received from the base station; a channel information transmission unit to transmit the channel information to a predetermined head node; and a source signal detection unit to detect a source signal acquired by performing a beam-forming of a data stream based on selection information by the base station, the selection information being associated with a radio channel formed between at least one active member terminal selected by the head node from a plurality of member terminals, and the base station.

According to another aspect of the present invention, there is provided a Space Division Multiple Access (SDMA) communication method, which includes receiving channel information from a plurality of member terminals within the same group, the channel information being associated with a radio channel formed between the plurality of member terminals and a base station; selecting at least one active member terminal from the plurality of member terminals based on the channel information; and transmitting selection information to the base station, the selection information being associated with a radio channel formed between the at least one active member terminal and the base station.

According to yet another aspect of the present invention, there is provided a source signal generating method, which includes generating a pilot signal for transmission to a plurality of member terminals within the same group; receiving, from a predetermined head node determined in advance with respect to the same group, selection information associated with a radio channel formed between at least one active member terminal and the base station when the head node selects the at least one active member terminal from the plurality of member terminals; and performing a beam-forming of a data stream based on the selection information to thereby generate a source signal.

According to another aspect of the present invention, there is provided a signal detecting method, which includes generating channel information of a radio channel formed between a base station and a terminal device using a pilot signal received from the base station; transmitting the channel information to a predetermined head node; and detecting a source signal acquired by performing a beam-forming of a data stream based on selection information by the base station, the selection information being associated with a radio channel formed between at least one active member terminal selected by the head node from a plurality of member terminals, and the base station.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 6 is an operational flowchart illustrating a method of Space Division Multiple Access (SDMA) communication according to an example embodiment of the present invention.

DETAILED DESCRIPTION OF THE EMBODIMENTS

Figure 1:
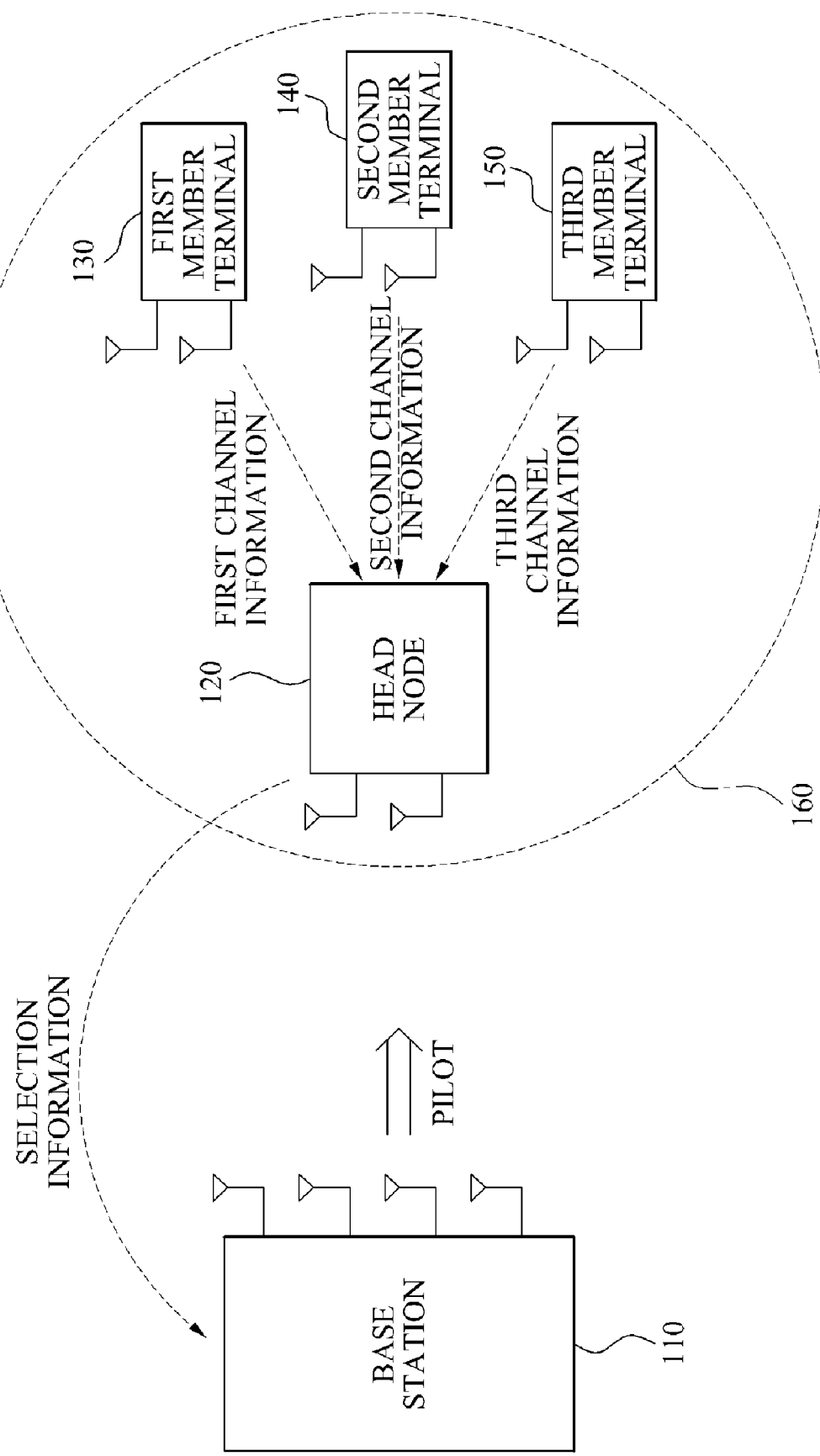
FIG. 1 is a diagram illustrating a communication system including a base station, a head node, and a plurality of member terminals according to an example embodiment of the present invention.

Reference will now be made in detail to present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a communication system according to an example embodiment of the present invention. Referring to FIG. 1, the communication system includes a base station (BS) 110, a head node 120, and a plurality of member terminals 130, 140, and 150. A plurality of antennas may be installed in each of the base station 110, the head node 120, and each of the member terminals 130, 140, and 150, respectively.

A first member terminal 130, a second member terminal 140, and a third member terminal 150, as shown in FIG. 1, are only representative of a plurality of mobile terminals used and are included in the same group 160. However, the head node 120 instead of the plurality of member terminals 130, 140, and 150 transmits selection information to the base station (BS) 110, which will be described in detail below.

The head node 120 may include a relay station or a mobile terminal, and may be determined in advance with respect to the member terminals 130, 140, and 150. In the case of a relay station where the head node 120 is fixed, an algorithm for determining the head node 120 is unnecessary. However, in the case of a mobile terminal where the head node 120 is mobile, several algorithms for determining the head node 120 may be suggested.

For example, from among channels formed between the plurality of mobile terminals and the base station 110, a mobile terminal having the best channel state information may be selected as the head node 120. In this case, this is because the head node 120 communicates with the base station 110 more precisely, that is, without errors occurring.

For another example, from among the plurality of mobile terminals, a mobile terminal having the least mobility may be selected as the head node 120. Specifically, when the head node 120 is frequently changed, an overall performance of a communication system may be deteriorated. In addition, when the head node 120 has a greater moving speed or location of the head node 120 is frequently changed, state information of a channel formed between the head node 120 and the base station 111 may be deteriorated.

For another example, from among the plurality of mobile terminals, a mobile terminal with the greatest available power may be selected as the head node 120. Specifically, the head node 120 transmits/receives a relatively greater amount of signals to/from the base station 120 in comparison with other mobile terminals, and thus the mobile terminal having the greatest available power may be selected as the head node 120.

For another example, from among the plurality of mobile terminals, any one mobile terminal may be selected as the head node 120 based on each traffic amount of the plurality of mobile terminals. In particular, from among the plurality of mobile terminals, a mobile terminal having the least traffic amount may be selected as the head node 120.

Therefore, when any one of the mobile terminals is selected as the head node 120, the head node 120 is selected considering a channel state, available power, mobility, amount of data traffic, and the like, thereby optimizing communication performance and capacity.

Also, the group 160 in which the member terminals 130, 140, and 150 belong may be set according to various algorithms or criterions. For example, the group 160 may be set such that member terminals included within a predetermined distance with respect to the head node 120 are included in the same group. Alternatively, the group 160 may be set based on the channel state information of the radio channel.

In this instance, when a plurality of neighboring terminals adjacent to the head node 120 exist, there may arise problems in the criterions for setting the group 160 or the member terminals 130, 140, and 150. In this instance, according to the present embodiment, the member terminals 130, 140, and 150 may be selected from among the plurality of neighboring terminals considering state information of a radio channel formed between the head node 120 and the plurality of neighboring terminals.

In this instance, the state of the radio channel is determined based on reception states of the signals received from the plurality of neighboring terminals, such as signal-to-noise (S/N) ratio, signal strength, and the like.

For example, when the signals received from the plurality of neighboring terminals have greater signal strength, the head node 120 may be determined to have good radio channel state. Conversely, when the signals have less signal strength, the head node 120 may be considered to have bad radio channel state. Further, when the radio channel is determined to be good, the head node 120 may determine that a distance between the head node 120 and the plurality of neighboring terminals is relatively short. Thus, the head node 120 may select at least one of the neighboring terminals as a member terminal based on the reception states of the signals received from all the neighboring terminals.

However, the member terminals 130, 140, and 150 may or may not be expressly specified in advance.

First, the case where the member terminals 130, 140, and 150 are expressly specified in advance will be hereinafter described in detail. The head node 120 may receive signals transmitted or broadcasted from each of the plurality of neighboring terminals. In this instance, the head node 120 may measure each amount of signals transmitted or broadcasted from the plurality of neighboring terminals, and select in advance at least one neighboring terminal as a member terminal. Here, the at least one neighboring terminal corresponds to a signal, the measured amount of which is more than a predetermined threshold. Also, the head node 120 may perform various operations according to the present example embodiment with the previously selected member terminal.

Also, according to the present example embodiment, the case where the member terminals 130, 140, and 150 may not be expressly specified in advance will be hereinafter described in detail.

In order to specify in advance the member terminal 130, 140, and 150 from among the plurality of neighboring terminals 130, 140, and 150, various signaling operations between the plurality of neighboring terminals 130, 140, and 150 and the head node 120 may be required, however, depending on example embodiments of the present invention, they may not be required.

Specifically, each of the neighboring terminals including the member terminals 130, 140, and 150 may transmit signals of channel information in a broadcast scheme. In this instance, the head node 120 may receive signals of channel information transmitted from each of the neighboring terminals, and measure each amount of the received signals of channel information. The head node 120 may assume that a neighboring terminal corresponding to a signal of channel information which is more than a predetermined threshold is selected as a member terminal. Also, the head node 120 may perform various operations according to the present embodiment with the neighboring terminal assumed to be selected as the member terminal. Thus, the present embodiment may be performed without performing separate operations for expressly specifying the member terminals 130, 140, and 150.

The base station (BS) 110 may perform a beam-forming of a data stream using a Space Division Multiple Access (SDMA) scheme. However, so that the base station (BS) 110 appropriately performs the beam-forming of the data stream, channel state information of the radio channel formed between the member terminals 130, 140, and 150 and the base station (BS) 110 has to be determined. For this purpose, the base station (BS) 110 broadcasts a pilot signal to all users, for example, all the member terminals 130, 140, and 150, and then receives feedback information corresponding to the pilot signal from all the users at the member terminals 130, 140, and 150 so as to determine the channel state.

Each of the member terminals 130, 140, and 150 estimates a channel state of a radio channel formed between the base station 110 and the member terminals 130, 140, and 150 using the pilot signal. The member terminals 130, 140, and 150 then generate first, second, and third channel information with respect to the radio channel.

In this instance, the first, second, and third channel information may include Channel Direction Information (CDI) or Channel Quality Information (CQI), respectively.

In this instance, $CQI_{k,i} = \|h_{k,i}\|^2$ of CQI with respect to $h_{k,i}$ of a radio channel formed between an i-th reception antenna installed in a k-th member terminal and the base station 110 is information being associated with a magnitude of a channel vector.

Also, when a quantization level of the CDI is B-bits, each of the member terminals 130, 140, and 150 may store a codebook including $2^B$ direction vectors. In this instance, the CDI may be information about an index of a direction vector most adjacent to a direction of an actual radio channel from among $2^B$ direction vectors.

Also, radio channels are formed between each of the member terminals 130, 140, and 150 and the head node 120. However, since a distance between each of the member terminals 130, 140, and 150 and the head node 120 is less than a distance between the base station 110 and each of the member terminals 130, 140, and 150, the radio channels formed between each of the member terminals 130, 140, and 150 and the head node 120 are likely to have good channel states. In general, the radio channels formed between each of the member terminals 130, 140, and 150 and the head node 120 may have relatively better channel states in comparison with those of the radio channels formed between each of the member terminals 130, 140, and 150 and the base station 110.

For example, radio channels formed between each of the member terminals 130, 140, and 150 and the head node 120, are not Rayleigh fading channels, although they are affected by Additive White Gaussian Noise (AWGN). However, in general, radio channels formed between the each of the member terminals 130, 140, and 150 and the base station 110 are Rayleigh fading channels.

In this instance, each of the member terminals 130, 140, and 150 transmits the first, second, and third channel information to the head node 120 without directly transmitting them to the base station 110. Specifically, the radio channel formed between each of the member terminals 130, 140, and 150 and the head node 120 has a relatively good channel state, and thus, the first, second, and third channel information may be transmitted to the head node 120 without errors occurring. Accordingly, the probability of performance deterioration of the beam-forming due to errors occurring in the transmission process of the first, second, third channel information also decreases.

In addition, the head node 120 selects at least one active member terminal from among the member terminals 130, 140, and 150 using the first, second, and third channel information. Specifically, the head node 120 may select the active member terminal using the CDI or CQI included in the first, second, and third channel information. Also, the head node 120 may select at least one active antenna from among reception antennas installed in the active member terminal.

Also, the head node 120 transmits, to the base station 110, selection information associated with the radio channel formed between the base station (BS) 110 and either the active member terminal or the active antenna. In this instance, the selection information may include CQI or CDI.

For example, it is assumed that the head node 120 selects the first member terminal 130 and the second member terminal 140 as active member terminals. In this instance, the head node 120 does not transmit the third channel information to the base station (BS) 110, and may transmit selection information including only the first and second channel information to the base station (BS) 110. When the first and second channel information include both the CQI and CDI, the head node 120 may transmit, to the base station (BS) 110, selection information including only the CDI included in the first and second channel information.

Also, the base station 110, upon receipt of the selection information, generates a source signal targeting the active member terminal(s), for example, the first member terminal 130 and the second member terminal 140, or the active antenna(s). The source signal is generated by performing a beam-forming of a data stream according to a zero-forcing beam forming scheme.

Figure 2:
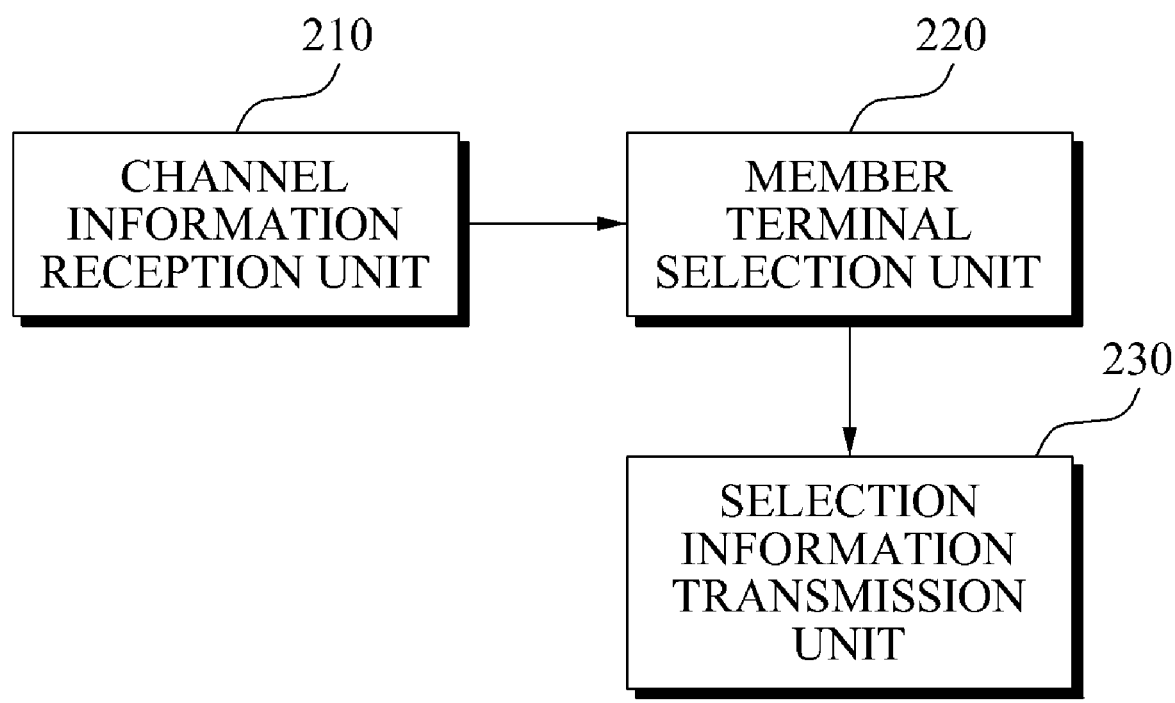
FIG. 2 is a block diagram illustrating a communication device using user cooperation according to an example embodiment of the present invention.

FIG. 2 is a block diagram illustrating a communication device using user cooperation according to an example embodiment of the present invention. Such a communication device may be installed at a terminal device or a relay station including a mobile terminal. Specifically, according to an example embodiment of the present invention, the communication device may be installed at the head node 120, as shown in FIG. 1.

Referring to FIG. 2, the communication device using the user cooperation includes a channel information reception unit 210, a member terminal selection unit 220, and a selection information transmission unit 230.

The channel information reception unit 210 receives channel information from a plurality of member terminals within the same group, for example, member terminals 130, 140, and 150 within the same group 160, as shown in FIG. 1. In this instance, the channel information is information about radio channels formed between each of the plurality of member terminals and the base station. Specifically, the channel information may include CQI or CDI of the radio channel formed between each of the plurality of member terminals 130, 140, and 150, and the base station (BS) 110.

In this instance, the plurality of member terminals, for example, the member terminals 130, 140, and 150 within the same group 160, may be or may not be expressly determined in advance as described in FIG. 1.

Also, the member terminal selection unit 220 selects at least one active member terminal from among the plurality of member terminals, for example, the member terminals 130, 140, and 150, based on channel information. In this instance, the member terminal selection unit 230 may select at least one active antenna receiving a source signal generated from the base station (BS) 110 from among at least one antenna installed in the active member terminal.

For example, in a communication system where a number of antennas installed at the base station (BS) is required to be greater than a number of active antennas, the member terminal selection unit 220 may select a portion of the plurality of member terminals as the active member terminal, and also select a portion of the plurality of antennas as the active antenna. In this instance, the member terminal selection unit 220 may select the active antenna in such a manner that either a Signal to Interference and Noise Ratio (SINR) in the active member terminal or a total amount of a data rate in the base station (BS) is maximized.

In this instance, the member terminal selection unit 220 may determine the active antenna using a Semi-orthogonal Antenna Selection (SAS) algorithm. Specifically, the SAS algorithm sequentially selects antennas, and more specifically selects the antennas in order of lower correlation from among correlations between respective radio channels of the antennas.

In this instance, the member terminal selection unit 220 may select the active member terminal using a Greedy User Selection (GUS) algorithm. For example, the member terminal selection unit 220 may select the active member terminal in such a manner that a total amount of data rate is maximized in the base station based on CQI included in the channel information.

Also, the selection information transmission unit 230 transmits, to the base station, selection information associated with the radio channel formed between the active member terminal and the base station. In this instance, the selection information may include CDI included in channel information received from the active member terminal. In this instance, the base station may perform a beam-forming of a data stream based on the selection information to generate a source signal.

Thus, the member terminals according to the example embodiment of the present invention do not directly feed back the channel information to the base station (BS). Specifically, an SDMA system according to the present embodiment may receive the channel information from a member terminal to select in advance the active member terminal or the active antenna, and transmit selection information associated with the active member terminal or the active antenna to the base station (BS). Accordingly, the present invention may reduce an amount of feedback data and also reduce errors occurring during a feedback process of the channel information.

Figure 3:
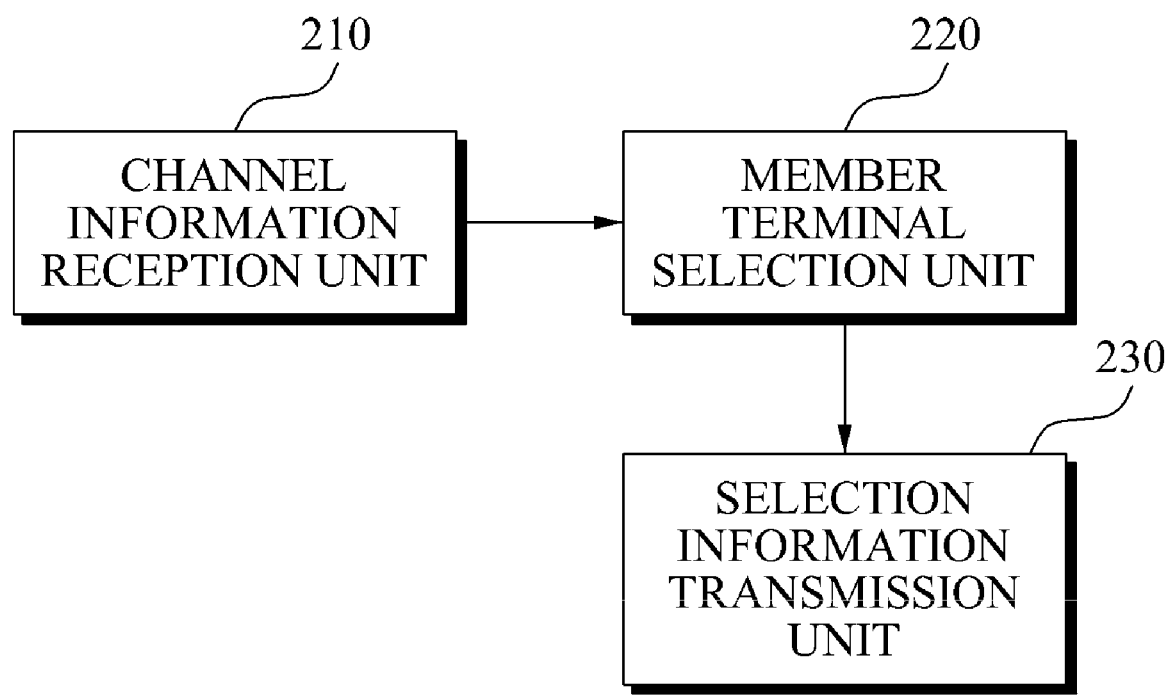
FIG. 3 is a block diagram illustrating a base station according to an example embodiment of the present invention.

FIG. 3 is a block diagram of a base station (BS) according to an example embodiment of the present invention. Such a base station (BS) may refer to the base station (BS) 110, as shown in FIG. 1, to generate a pilot signal, receive channel information fed back from a plurality of member terminals and then transmit a source signal to an active member terminal.

Referring to FIG. 3, the base station (BS) includes a pilot generation unit 310, a selection information reception unit 320, and a source signal generation unit 330.

The pilot generation unit 310 generates a pilot signal for transmission to a plurality of member terminals within the same group, for example, member terminals 130, 140, and 150 within the same group 160, as shown in FIG. 1. Specifically, so that the base station (BS) 110 effectively performs a beam-forming of a data stream, a state of a radio channel formed between the base station (BS) 110 and the each of the plurality of member terminals 130, 140, and 150 is required to be determined. In this instance, the base station (BS) 110 may transmit or broadcast the pilot signal to the plurality of member terminals 13, 140, and 150.

Also, as described above, the plurality of member terminals 130, 140, and 150, receive the pilot signal, and transmit the channel information to the head node 120, as shown in FIG. 1. In this instance, the head node 120 is determined in advance with respect to the same group, and the head node 120 selects at least one active member terminal from among the plurality of member terminals 130, 140, and 150. Also, the head node 120 generates selection information associated with the radio channel formed between the active member terminal and the base station (BS) 110. As previously described in connection with FIG. 2, the head node 120 may be any one of a user terminal and a relay station.

In this instance, the selection information reception unit 320 receives, from the head node 120, selection information associated with the radio channel formed between the active member terminal and the base station (BS) 110. In this instance, the selection information may include CDI of the radio channel formed between the active member terminal and the base station (BS) 110.

Also, the source signal generation unit 330 performs a beam-forming of a data stream based on the selection information to generate a source signal. In this instance, the source signal generation unit 330 may generate the source signal using a zero forcing beam-forming scheme.

Figure 4:
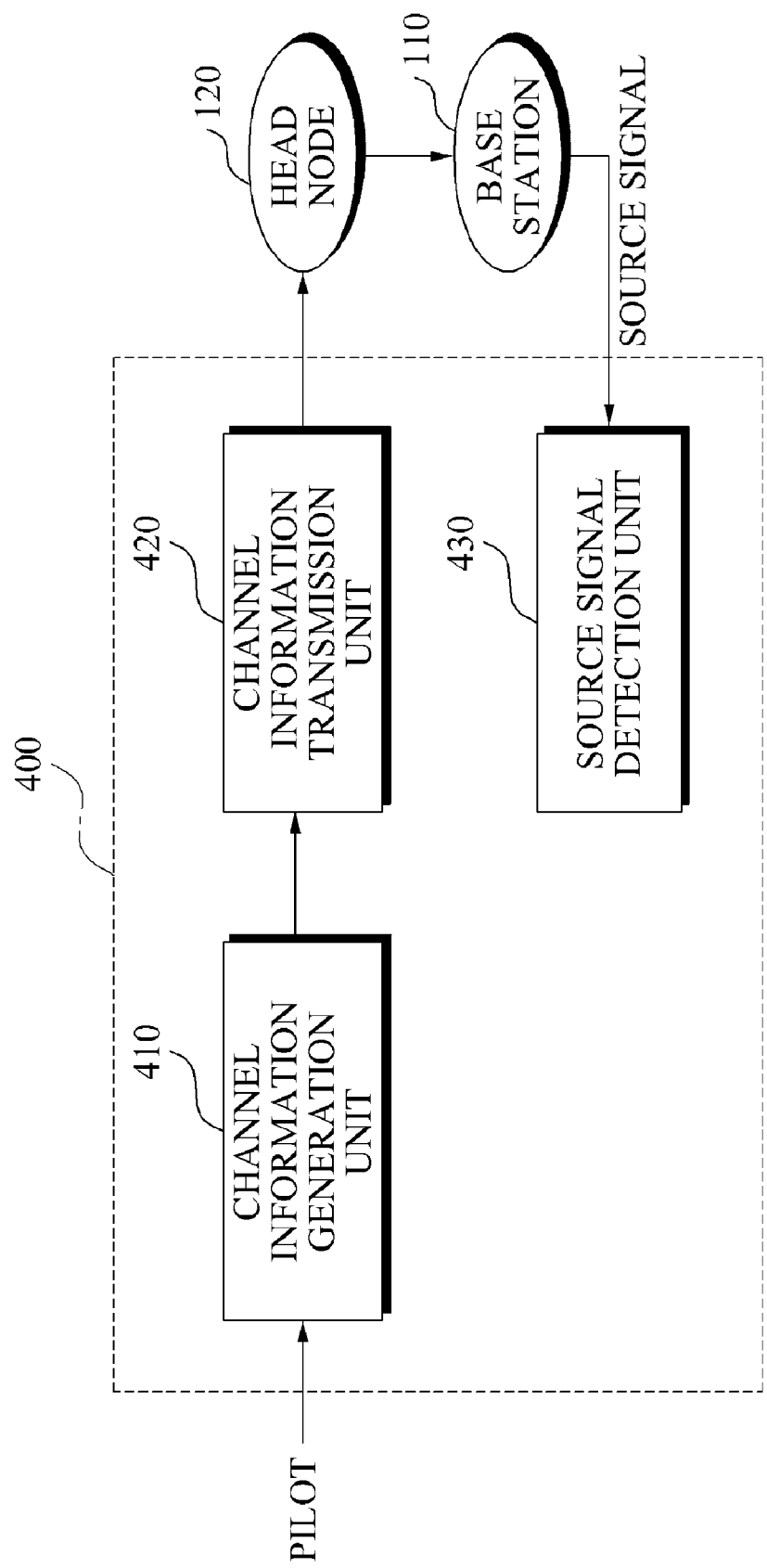
FIG. 4 is a block diagram illustrating a terminal device according to an example embodiment of the present invention.

Turning now to FIG. 4, a block diagram of a terminal device 400 according to an example embodiment of the present invention is shown. Such a terminal device 400 may be installed at each of a plurality of member terminals, for example, member terminals 130, 140, and 150 within the same group 160, in communication with a head node 120 and a base station (BS) 110, as shown in FIG. 1.

Referring to FIG. 4, the terminal device 400 includes a channel information generation unit 410, a channel information transmission unit 420, and a source signal detection unit 430.

The channel information generation unit 410 generates channel information of a radio channel formed between the base station (BS) and the terminal device 400 using a pilot signal received from the base station (BS). In this instance, the channel information may include CQI and CDI.

Also, the channel information transmission unit 420 transmits the channel information to a predetermined head node 120. Specifically, the terminal device 400 according to the present embodiment does not directly feed back the channel information to the base station 110; rather, such a terminal device 400 transmits the channel information to the predetermined head node 120.

In this instance, the head node 120 may select either an active member terminal or an active antenna using the received channel information, and transmit, to the base station 110, selection information associated with the radio channel formed between the base station 110 and either the active member terminal or the active antenna. Thus, the base station 110 generates a source signal acquired by performing a beam-forming of a data stream using the selection information.

Also, the source signal detection unit 430 detects the source signal acquired by performing the beam-forming of the data stream based on the selection information by the base station 110.

Figure 5:
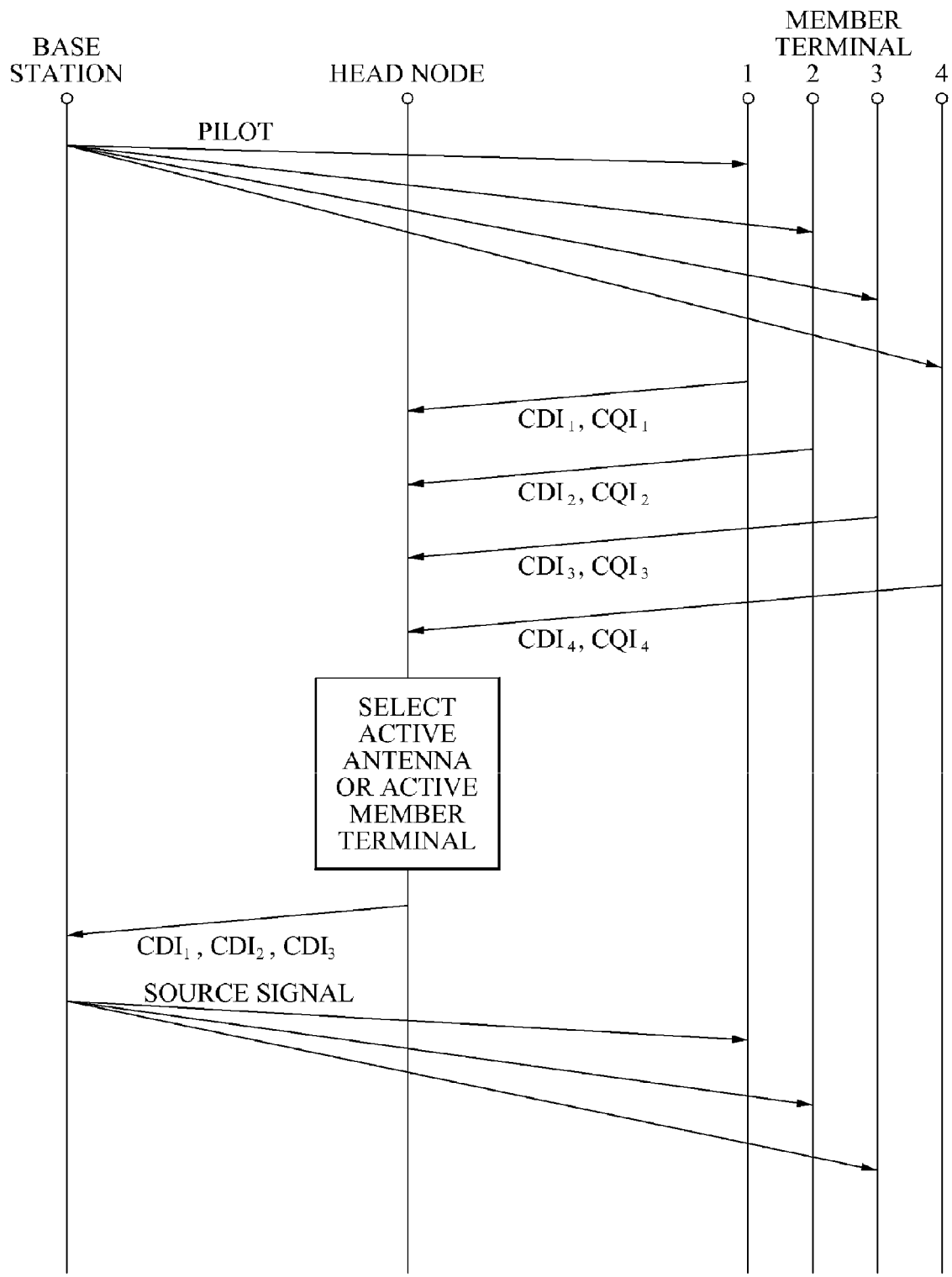
FIG. 5 is a flowchart illustrating operations of a base station, a head node, and a plurality of the member terminals according to an example embodiment of the present invention.

FIG. 5 is a flowchart illustrating operations of a base station, a head node, and a plurality of the member terminals according to an example embodiment of the present invention.

Referring to FIG. 5, the base station broadcasts a pilot signal to all member terminals. Each of the member terminals receiving the pilot signal estimates a radio channel formed between the base station and each of the member terminals, and generates channel information with respect to the radio channel. In this instance, the channel information includes CDI and CQI.

Also, each of the member terminals transmits the CDI and CQI to a predetermined head node. In this instance, a relay node may be a relay station or a terminal.

The head node receives the CDI and CQI from each of the member terminals to select one or more active antennas or active member terminals. In this instance, in FIG. 5, the head node selects first, second, and third member terminals as the active member terminals.

The head node transmits, to the base station, selection information including first CDI, second CDI, and third CDI of the first, second, and third member terminals acting as the active member terminals. In this instance, although not shown in FIG. 5, the head node may transmit the selection information to the active member terminals.

The base station may select a beam-forming vector corresponding to the first, second and third member terminals using the selection information. In this instance, the base station generates a source signal using the selected beam-forming vector by performing a beam-forming of a data stream.

FIG. 6 is an operational flowchart illustrating a method of SDMA communication according to an example embodiment of the present invention.

Referring to FIG. 6, in operation S610, the base station (BS) generates a pilot signal for transmission to all users at all member terminals.

Also, in operation S620, each of the member terminals generates channel information of a radio channel formed between the base station (BS) and each of the member terminals using the pilot signal received from the base station (BS). In this instance, the channel information may include CDI or CQI.

In operation S630, the head node receives channel information generated from each of the member terminals.

In operation S640, the head node selects one or more active member terminals or active antennas using the channel information. In this instance, the head node may select the active member terminal(s) using the GUS algorithm, and also select the active antenna(s) using the SAS algorithm. Also, the head node generates selection information associated with a radio channel formed between the base station and either the selected active member terminal(s) or active antenna(s). In this instance, the selection information may include the CDI.

In operation S650, the head node transmits the selection information to the base station (BS).

In operation S660, the base station (BS) receives the selection information from the head node, and generates a source signal to the selected active member terminal(s) acquired by performing a beam-forming of a data stream using the received selection information. In this instance, the base station may perform the beam-forming of the data stream using the zero forcing beam-forming scheme.

In operation S670, each active member terminal detects the source signal transmitted from the base station (BS).

As described from the foregoing, the space-division multiple access (SDMA) communication technique according to various example embodiments of the present invention advantageously enables a base station (BS) to effectively perform beam-forming without unreasonably increasing the amount of the feedback information.

The SDMA communication method according to the above-described example embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Various components of the communication device, as shown in FIG. 2, such as, the channel information reception unit 210, the member terminal selection unit 220 and the selection information transmission unit 230 can be integrated into a single control unit, such as a baseband processor installed at the head node 120, as shown in FIG. 1, or alternatively, can be implemented in software or hardware, such as, for example, a field programmable gate array (FPGA) and an application specific integrated circuit (ASIC). Similarly, various components of the base station, as shown in FIG. 3, such as, the pilot generation unit 310, the selection information reception unit 320 and the source signal generating unit 330 can be integrated into a single control unit, or alternatively, can be implemented in software or hardware. Likewise, the channel information generation unit 410, the channel information transmission unit 420 and the source signal detection unit 430, shown in FIG. 4, can also be integrated at each member terminal. As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

Moreover, in mobile communication systems, such as $3^{rd}$ Generation Partnership Project (3GPP), 3GPP2 and upcoming 4G systems, the base station 110, shown in FIG. 1, is known as "Node-B" as specified in accordance with 3GPP, 3GPP2 and 4G specifications, to handle tasks, including, for example, mobility management, call control, session management and identity management. The head node 120 and the member terminals 130, 140 and 150 correspond to mobile stations which connect to the base station 110, which can represent mobile phones (handsets), personal digital assistants (PDAs), or other devices such as wireless cards in laptop computers or computers with internet wireless connectivity, WiFi and WiMAX gadgets etc. The wireless network can be that of any of the wireless communication technologies, including, but not limited to: GSM (Global System for Mobile Communications), CDMA (Code Division Multiple Access), WLL (Wireless Local Loop), WAN (Wide Area Network), WiFi, and WiMAX (Worldwide Interoperability for Microwave Access based on IEEE 802.16 standards), and is applicable with many existing and emerging wireless standards such as IEEE 802.11 (for wireless local area networks), IEEE 802.16 (for wireless metropolitan area networks) and IEEE 802.02 (for mobile broadband wireless access).

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the base station 110 can also be an IEEE 802.11 access point (AP) and the UE 120 can also be any client station. Alternatively, the base station 110 can also be implemented with a GERAN (GSM/EDGE radio access technology) in a UTRAN (UMTS Terrestrial Radio Access Network) using a wideband code division multiple access (WCDMA) technology. However, the invention is not limited to those radio access technologies, but it can also be applied to the following radio access technologies: GSM (Global System for Mobile Communications), GPRS (General Packet Radio Service), E-GPRS (EDGE GPRS), CDMA2000 (CDMA, Code Division Multiple Access), US-TDMA (US Time Division Multiple Access), and IS-95. Accordingly, it is intended, therefore, that the present invention not be limited to the various example embodiments disclosed, but that the present invention includes all embodiments falling within the scope of the appended claims.

What is claimed is:

1. A communication device installed at a designated terminal in a wireless communication system having a base station and a plurality of member terminals, the communication device comprising:
 a channel information reception unit to receive channel information from the plurality of member terminals within a designated group, the channel information being associated with a radio channel formed between the plurality of member terminals and the base station;
 a member terminal selection unit to select at least one active member terminal from the plurality of member terminals based on the channel information; and
 a selection information transmission unit to transmit selection information to the base station, the selection information being associated with a radio channel formed between the at least one active member terminal and the base station.

2. The communication device of claim 1, wherein the member terminal selection unit selects at least one active antenna from among at least one antenna installed in the at least one active member terminal, the at least one active antenna receiving a source signal generated from the base station.

3. The communication device of claim 2, wherein the member terminal selection unit selects the active antenna in such a manner that either a Signal to Interference and Noise Ratio (SINR) in the active member terminal or a total amount of a data rate in the base station is maximized.

4. The communication device of claim 2, wherein the member terminal selection unit determines the active antenna using a Semi-orthogonal Antenna Selection (SAS) algorithm.

5. The communication device of claim 2, wherein the selection information further includes information associated with the active antenna.

6. The communication device of claim 1, wherein the base station performs beam-forming of a data stream based on the selection information.

7. The communication device of claim 1, wherein the member terminal selection unit selects the active member terminal using a Greedy User Selection (GUS) algorithm.

8. The communication device of claim 1, wherein the selection information includes Channel Direction Information (CDI) of the radio channel formed between the active member terminal and the base station.

9. The communication device of claim 1, wherein the plurality of member terminals are selected from a plurality of neighboring terminals adjacent to the communication device according to a predetermined criterion, including a state of a radio channel formed between the communication device and the plurality of neighboring terminals.

10. A Space Division Multiple Access (SDMA) communication method, the method comprising:
 receiving channel information from a plurality of member terminals within a designated group, the channel information being associated with a radio channel formed between the plurality of member terminals and a base station;
 selecting at least one active member terminal from the plurality of member terminals based on the channel information; and
 transmitting selection information to the base station, the selection information being associated with a radio channel formed between the at least one active member terminal and the base station.

11. The method of claim 10, wherein the selecting selects at least one active antenna from at least one antenna installed in the at least one active member terminal, the at least one active antenna receiving a source signal generated from the base station.

12. A computer-readable medium storing thereon a program for implementing the method of claim 10.

* * * * *